United States Patent [19]

Sauerwein et al.

[11] 4,449,329

[45] May 22, 1984

[54] COMPOSITE WASHER ASSEMBLY

[75] Inventors: William D. Sauerwein, Westminster, Md.; Daniel H. Sides, New Freedom, Pa.; Steven A. Weber, Glyndon; James R. Horney, Cockeysville, both of Md.

[73] Assignee: Black & Decker Inc., Newark, Del.

[21] Appl. No.: 406,086

[22] Filed: Aug. 6, 1982

[51] Int. Cl.³ .............................................. B24B 41/04
[52] U.S. Cl. ..................................... 51/168; 403/259; 403/343; 248/634; 411/544
[58] Field of Search .................. 51/168, 170 T, 170 R; 411/544, 531, 150; 248/613, 634; 403/203, 259, 260, 343

[56] References Cited

U.S. PATENT DOCUMENTS

| | | |
|---|---|---|
| 1,386,988 | 8/1921 | Burlew . |
| 1,917,929 | 7/1933 | Duffy . |
| 2,094,823 | 10/1937 | Sample et al. . |
| 2,187,350 | 1/1940 | Kuzmick . |
| 2,295,282 | 9/1942 | Mall ..................................... 51/168 |
| 2,629,990 | 3/1953 | Tocci-Guilbert . |
| 2,633,008 | 3/1953 | Tocci-Guilbert . |
| 2,717,478 | 9/1955 | Blum . |
| 2,767,527 | 10/1956 | Tocci-Guilbert . |
| 2,767,528 | 10/1956 | Tocci-Guilbert . |
| 3,036,412 | 5/1962 | Tocci-Guilbert . |
| 4,067,184 | 1/1978 | Johnson, Jr. . |

FOREIGN PATENT DOCUMENTS 434877 9/1935 United Kingdom ................ 248/634

Primary Examiner—Roscoe V. Parker
Attorney, Agent, or Firm—R. B. Sherer; H. Weinstein; Charles E. Yocum

[57] ABSTRACT

An annular composite washer assembly provides a "soft" mount for a tool element subassembly mounted on the threaded output spindle of a portable grinder or other power tool. The composite washer includes a pair of flat annular washers and a molded body therebetween. The body has integrally-molded inner and outer annular bands joined integrally with the inner and outer diameters of the respective washers. A first pair of blind axial pockets, diametrically opposed to one another, extends through the first washer and the body and terminates at the second washer. A second pair of blind axial pockets, diametrically opposed to one another and shifted circumferentially with respect to the first pair of blind axial pockets (preferably by ninety degrees) extends through the second washer, through the body, and terminates at the first washer. A second embodiment includes a first and second set of three equidistantly circumferentially spaced pockets, one set formed through the first washer, and the other set formed through the second washer. The pockets formed through the second washer are shifted circumferentially by approximately 60° with respect to the respective pockets formed through the first washer.

15 Claims, 7 Drawing Figures

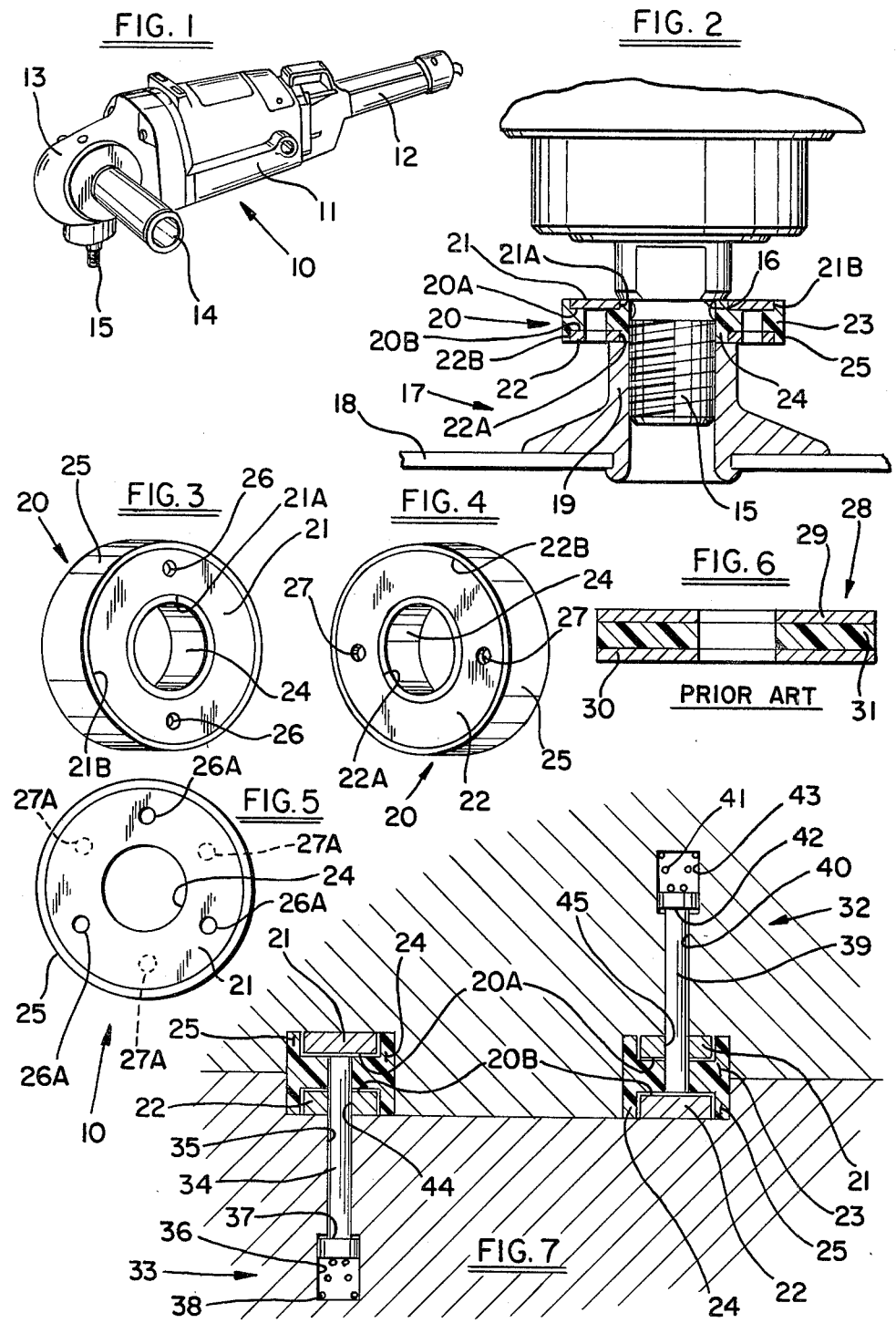

4,449,329

COMPOSITE WASHER ASSEMBLY

CROSS REFERENCE TO RELATED APPLICATION

The subject matter of this patent application is related to that disclosed in U.S. patent application Ser. No. 406,087, filed Aug. 6, 1982, for "Method of Producing a Composite Washer Assembly", and assigned to the assignee of the present invention.

BACKGROUND OF THE INVENTION

1. Field of the Invention

The present invention relates to an improved system for mounting a tool element subassembly on the output spindle of a power tool, and more particularly, to an annular composite washer assembly received over the tool spindle of a heavy-duty portable grinder and disposed axially between the collar portion of an abrasive disc subassembly and an annular shoulder formed on the spindle, thereby providing a "soft" mounting system for preventing the abrasive disc subassembly from locking or jamming against the shoulder on the spindle.

2. Description of the Prior Art

The abrasive disc subassembly used on a heavy-duty portable grinder consists of an abrasive disc carried by an internally-threaded collar. The collar is mounted on the externally-threaded spindle of the grinder. As the motor in the grinder is energized, the collar self-threads on to the spindle and bears against an annular shoulder formed on the spindle. While thus securely mounting the abrasive disc subassembly to the spindle, it is often quite difficult to remove the subassembly from the spindle. The collar tends to lock or jam against the shoulder on the spindle, especially as the grinder is used repeatedly; and the situation is aggravating on heavy construction jobs, maintenance operations or the like, where the abrasive disc subassembly quickly becomes worn and must be replaced frequently.

In an apparent effort to correct this problem, others in the art have resorted to a composite assembly, which is placed over the spindle and is disposed axially between the annular shoulder on the spindle and the collar on the abrasive disc subassembly. The composite assembly is a "sandwich" and consists of a pair of metal washers adhesively bonded to a rubber or plastic washer therebetween. While perhaps alleviating the problem initially, this composite assembly does not work over an extended period of time, especially in the severe environment often encountered in the use of a heavy-duty portable grinder. More specifically, the washers may not be properly alined coaxially with one another, tolerance accumulations in the overall assembly are not readily compensated, and the plastic or rubber tends to rapidly extrude from the sandwiched assembly after a few uses. This destroys the utility of the assembly for the purposes intended.

Moreover, in the general art relating to various means for reducing vibration and noise during operation of a power tool, a number of designs and constructions have been disclosed. For example, in U.S. Letters Pat. No. 4,067,184, a fabricated washer assembly has been disclosed consisting of a pair of plastic washers with a soft rubber washer therebetween. Each of the plastic washers has a pair of projections received through holes in the intermediate rubber washer and received in corresponding holes formed in the other washer. The purpose of this construction is to reduce vibration and noise. This result is altogether different from the primary objective of the present invention.

SUMMARY OF THE INVENTION

Accordingly, it is an object of the present invention to alleviate the inherent deficiencies and disadvantages of the prior art by providing an annular composite washer assembly, one which comprises an integrally-molded component.

It is another object of the present invention to provide an annular composite washer assembly that may be produced easily and economically.

In accordance with the broad teachings of the present invention, an annular washer assembly is provided for use with a portable grinder or other power tool of the type having a tool element subassembly and further having a spindle provided with an annular shoulder. The washer assembly includes first and second annular washers, spaced axially from one another, substantially parallel to one another, and substantially coaxially aligned with each other. Resilient means or an annular body is integrally molded between the washers. The body has a first integral annular portion extending radially inwardly and joining the respective inner diameters of the washers, and preferably, the body further has a second integral annular portion extending radially outwardly and joining the respective outer diameters of the washers. The washer assembly forms a precision, yet economical, "soft" mount for the tool element subassembly and prevents the subassembly from locking against the shoulder on the spindle.

In accordance with the further teachings of the present invention, the washer assembly has a first pair of blind axial pockets, substantially diametrically opposite to one another, extending axially through the first washer and through the molded body, and terminating at the second washer. The washer assembly further has a second pair of blind axial pockets, substantially diametrically opposite to one another, and shifted circumferentially with respect to the first pair of blind axial pockets. The second pair of blind axial pockets extend axially through the second washer, through the body, and terminate at the first washer.

These and other objects of the present invention will become apparent from a reading of the following specification, taken in conjunction with the enclosed drawings.

BRIEF DESCRIPTION OF THE DRAWINGS

FIG. 1 is a perspective view of a typical power tool to which the teachings of the present invention may be applied.

FIG. 2 is an elevational sectional detail view of the right-angle spindle of the tool shown in FIG. 1, showing the annular composite washer assembly of the present invention mounted thereon.

FIG. 3 is a front isometric view of the washer assembly of the present invention.

FIG. 4 is a rear isometric view of the washer assembly of the present invention.

FIG. 5 is a top plan view of an additional embodiment of the washer assembly of the present invention.

FIG. 6 is an elevational sectional view of a fabricated assembly resorted to in the prior art.

FIG. 7 is an elevational sectional detail view of a 90° segment of a preferred mold for producing the washer assembly of the present invention.

DESCRIPTION OF THE PREFERRED EMBODIMENT

With reference to FIG. 1, there is illustrated a portable electric grinder 10 with which the teachings of the present invention may be applied. It will be appreciated by those skilled in the art, however, that the grinder 10 is only exemplary of a wide variety of power tools and other devices to which the invention may be applied. With this in mind, the grinder 10 generally comprises a motor housing 11, a switch handle 12, a gear case 13, an auxiliary handle 14, and a right-angle spindle 15 for mounting a grinding wheel subassembly or other tool element subassembly. With further reference to FIG. 2, the spindle 15 is externally threaded and has an annular shoulder 16 formed thereon. A tool element subassembly, or abrasive disc subassembly 17, is threadably mounted on the spindle 15. The abrasive disc subassembly 17 includes an abrasive disc 18 carried by an internally-threaded collar 19.

In accordance with the teachings of the present invention, and with reference to FIGS. 2, 3 and 4, an annular composite washer assembly 20 is disposed axially between the shoulder 16 on the spindle 15 and the collar 19 on the abrasive disc subassembly 17. This washer assembly 20 includes first and second flat annular washers 21 and 22, respectively, having substantially uninterrupted inner or opposing faces 20A and 20B. Preferably, the washers 20,21, are made of a suitable metal. These washers 20, 21 are axially spaced relative to one another, are substantially parallel to, and coaxially aligned with one another. Resilient means, or an annular body, 23 is disposed between the flat washers 21, 22 and is integrally molded thereto. This body 23 is molded from a suitable plastic substance which is preferably a thermoplastic polyurethane resin although many suitable substances, including such elastomers as nylon resin, may be selected. The body 23 has an inner annular portion or band 24 extending radially inwardly therefrom and joined integrally to at least a portion of the respective inner diameters or interior perimeter surfaces 21A and 22A of the washers 21,22. The body further has an outer annular portion or band 25 extending radially therefrom and joined integrally to at least a portion of the respective outer diameters or outer perimeter surfaces 21B and 22B of the washers 21, 22. The integral annular bands 24, 25 are concentric and preferably (but not necessarily) are coterminous with the outer faces of the washers 21,22, thereby defining the axial length of the composite washer assembly 20. The inner band 24 engages the threaded spindle 15, and the threads on the spindle 15 "bite" into the relatively-soft plastic material of the band 24. As shown in FIG. 2, the cross-section of one side of the washer assembly 20 is thus in the form of an "H".

With reference again to FIGS. 2,3 and 4, the washer assembly 20 has a first pair of blind axial pockets 26 substantially diametrically opposed to one another. The pockets 26 extend through the first washer 21 and through the molded body 23 and terminate at the second washer 22. The washer assembly 20 further has a second pair of blind axial pockets 27 substantially diametrically opposed to one another and shifted circumferentially (preferably by approximately ninety (90) degrees) with respect to the first pair of pockets 26. The second pair of blind axial pockets 27 extend through the second washer 22 and through the molded body 23 and terminate at the first washer 21.

A second embodiment of the present invention is illustrated in FIG. 5. Here a first plurality of blind axial pockets 26A are spaced equidistantly from each other by an angular or circumferential distance of 120° (in the case of three pockets) and extends through the first washer 21, through the molded body 23, and terminate at the second washer 22. Similarly, a second plurality of blind axial pockets 27A extends through the second washer 22, through the molded body 23, and terminate at the first washer 21. Pockets 27A are also equidistantly spaced by an angular distance of 120°, but are shifted circumferentially approximately 60° with respect to pockets 26A (again in the case of three pockets).

The prior art (as previously referred to) may be illustrated by the composite assembly 28 of FIG. 6. This assembly 28 merely consists of a pair of metal washers 29 and 30 adhesively joined to a rubber or plastic washer 31.

With reference to FIG. 7, there is illustrated a method for producing the first embodiment of the annular composite washer assembly 20 of the present invention. The method uses a mold comprising a stationary mold half or first portion 32 and a movable mold half or second portion 33. A first pair of retractable pins, one of which is shown at 34, is mounted in the movable portion 33 of the mold. The pins 34, which are substantially diametrically opposed to one another, are slidably mounted in respective bores 35. A counterbore 36 communicates with the bore 35 and forms an abutment for cooperating with a shoulder 37 formed on the pin, thereby preventing the pin from being ejected out of the mold portion 33 (when the mold is opened). A spring 38 is trapped within each counterbore 36 and constantly urges the pin 34 towards the abutment. A second pair of diametrically-opposed spring-loaded retractable pins, one of which is shown at 39, is mounted in respective bores 40 in the stationary portion 32 of the mold. These pins 39 are resiliently biased by springs 41 and have shoulders 42 cooperating with abutments formed by communicating counterbores 43, thereby preventing the pins 39 from being ejected from the stationary portion 32 of the mold (when the mold is opened). The second pair of pins 39 is shifted circumferentially (preferably by ninety (90) degrees) with respect to the first pair of pins 34. The first pins 34 project through respective holes 44 in the second washer 22, and through the molded body 23, and engage the inner face 20A of the first washer 21. Similarly, the second pins 39 project through holes 45 in the first washer 21, and through the molded body 23, and engage the inner face 20B of the second washer 22. The pins 34 and 39 accurately position the washers 21 and 22 in the mold, coaxially with one another. The pins 34 and 39 also minimize the amount of flash generated between the mold portions 32, 33. It will be appreciated, of course, that these pairs of pins 34, 39, respectively, form the respective pairs of blind axial pockets 26, 27 in the composite washer assembly 20. The pins 34,39 are retractable when the mold portions 32,33 are brought together, and the springs 38, 41 provide the proper resilient loading on the pins without interfering with the positioning or locating of the washers 21,22 in the mold.

With this structure of the mold in mind, and again referring to FIG. 7, the steps for molding the composite washer assembly 20 are as follows: The first washer 21 is positioned in the first portion 32 of the mold such that the second pair of pins 39 protrude through the holes 45 in the first washer 21. Similarly, the second washer 22 is positioned in the second portion 33 of the mold such that the first pair of pins 34 protrude through the holes 44 in the second washer 22. The mold portions 32, 33 are closed together, positioning the washers 21, 22 coaxially and substantially parallel in the mold.

A plasticated or molten plastic substance, such as a thermoplastic, is introduced under pressure into the mold between the washers 21, 22 and forms the annular bands 24, 25 around the inner and outer diameters, 21B, 21B and 22A, 22B, respectively, of the washers 21, 22. The thermoplastic is at a temperature in the range of from 320° F. to 450° F. when introduced into the mold. The thermoplastic is allowed to solidify in the mold for approximately 45 seconds or longer. Then the mold portions 32, 33 are opened, and the now-integral composite washer assembly 20 is removed.

It should be noted that the order in which the washers 21, 22 are positioned in the mold may be reversed, such that the second washer 22 may be positioned in the second portion 33 before the first washer 21 is positioned in the first portion 32.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. For use with a portable grinder or other power tool of the type having a tool element subassembly and further having a spindle provided with an annular shoulder, an annular composite washer assembly received over the spindle and disposed axially between the shoulder and the tool element subassembly, said washer assembly comprising a first annular washer, a second annular washer spaced axially from the first washer, substantially parallel thereto and aligned coaxially therewith, the washers having respective inner and outer diameters, and an annular resilient body between the first and second washers and integrally molded thereto, the body having a first integral annular band extending radially inwardly of the washers and joined to the respective inner diameters thereof, and the body further having a second integral annular band extending radially outwardly of the washers and joined to the respective outer diameters thereof, whereby the washer assembly forms a soft mount for the tool element subassembly.

2. For use with a portable grinder or other power tool of the type having a tool element subassembly and further having a spindle provided with an annular shoulder, an annular composite washer assembly received over the spindle and disposed axially between the shoulder and the tool element subassembly, said washer assembly comprising a first annular washer, a second annular washer spaced axially of the first washer, substantially parallel thereto and aligned coaxially therewith, the first and second washers being made from a suitable metal and having respective inner diameters, and an annular plastic body between the first and second washers and integrally molded thereto, the body having an integral annular band extending radially inwardly of the washers and joining the respective inner diameters thereof, and the integral annular band of the body having an axial length substantially coterminous with the washers, thereby defining the axial thickness of the washer assembly, whereby the washer assembly prevents the tool element subassembly from locking against the shoulder.

3. An article of manufacture, comprising: a composite washer assembly including a first annular washer, a second annular washer spaced axially of the first washer substantially parallel thereto and aligned coaxially therewith, an annular elastomeric body between the first and second washers and integrally molded thereto, the washer assembly having a first plurality of blind axial pockets, substantially equidistantly circumferentially spaced from one another, and extending axially through the first washer and through the body and terminating at the second washer, the washer assembly further having a second plurality of blind axial pockets, substantially equidistantly circumferentially spaced from one another and shifted circumferentially with respect to the first plurality of blind axial pockets, and the second plurality of blind axial pockets extending axially through the second washer and through the body and terminating at the first washer.

4. The combination claimed in claim 3, wherein each of the first and second plurality of pockets comprise three pockets circumferentially spaced approximately 120° from each other, and wherein the second plurality of pockets is shifted circumferentially, by approximately 60°, with respect to the first plurality of pockets.

5. For use with a portable grinder or other power tool of the type having a tool element subassembly and further having a spindle provided with an annular shoulder, an annular composite washer assembly received over the spindle and disposed axially between the shoulder and the tool element subassembly, said washer assembly comprising a first annular washer, a second annular washer spaced axially of the first washer, substantially parallel thereto and aligned coaxially therewith, the washers having respective inner and outer diameters, and an annular body between the first and second washers and integrally molded thereto, the body having a first integral annular band extending radially inwardly of the washers and joining the respective inner diameters thereof, the body further having a second integral annular band extending radially outwardly of the washers and joining the respective outer diameters thereof, the washer assembly having a first pair of blind axial pockets, substantially diametrically opposite to one another, and extending axially through the first washer and through the body and terminating at the second washer, and the washer assembly further having a second pair of blind axial pockets, substantially diametrically opposite to one another and shifted circumferentially by approximately ninety degrees with respect to the first pair of blind axial pockets, the second pair of blind axial pockets extending axially through the second washer and through the body and terminating at the first washer, whereby the washer assembly forms a "soft" mount for the tool element subassembly, thereby preventing the tool element subassembly from locking against the shoulder.

6. A composite washer assembly, comprising: a first washer having first inner and outer perimeter surfaces, a second washer having second inner and outer perimeter surfaces, resilient means sandwiched between said first and second washers for maintaining said washers in substantially coaxial alignment, and said resilient means engaging at least a portion of said first and second outer perimeter surfaces on said respective first and second washers.

7. The combination claimed in claim 6, wherein said resilient means engages at least a portion of said first and second inner perimeter surfaces on said respective first and second washers.

8. The combination claimed in claim 6 wherein said resilient means engages at least a portion of said first and second inner and outer perimeter surfaces on said respective first and second washers.

9. The combination claimed in claim 8, wherein said washers are spaced apart at predetermined axial distances, and wherein said resilient means further maintains said first and second washers substantially parallel to one another.

10. The combination claimed in claim 9, wherein said first and second washers have respective first and second opposing faces, and wherein said first and second opposing faces are substantially uninterrupted by projections.

11. The combination claimed in claim 10, wherein said washers are formed of metal, and wherein said resilient means is formed of plastic.

12. The combination claimed in claim 11, wherein said resilient means encompasses said inner and outer perimeter surfaces of said washers.

13. The combination claimed in claim 12, wherein said washers are a pair of annular members, and wherein said plastic resilient means is integrally molded to said washers.

14. The combination claimed in claim 13, wherein said resilient means is formed of thermoplastic polyurethane resin.

15. The combination claimed in claim 13, wherein said resilient means is formed of nylon resin.

* * * * *